Oct. 9, 1962 K. M. PELL 3,057,281

STEP AND REPEAT PHOTOGRAPHIC APPARATUS

Filed Nov. 3, 1959

INVENTOR.
KENNETH M. PELL

BY
Miller Morriss & Pappas

ATTORNEYS

United States Patent Office 3,057,281
Patented Oct. 9, 1962

3,057,281
STEP AND REPEAT PHOTOGRAPHIC APPARATUS
Kenneth M. Pell, 307 N. Chestnut, Lansing, Mich.
Filed Nov. 3, 1959, Ser. No. 850,685
1 Claim. (Cl. 95—73)

This invention relates to a process and apparatus for exposing in adjusted register orientation multiple images of a composited negative or positive onto a sensitized metal press plate and more particularly to a process and apparatus which eliminates the need for costly step and repeat machines in small printing shops and provides means for small printing shops to do multiple image printing hitherto reserved to the larger printing companies.

This application is a continuation-in-part of the applicant's earlier filed co-pending application Serial Number 762,570, filed on September 22, 1958, entitled Step and Repeat Process and Apparatus. In this earlier filed co-pending application, the blue-line gridded reference sheet was utilized in placing the negative or positive in direct contact with the sensitized plate. The presence of the blue-line reference sheet during the exposure process proved unsatisfactory in certain close-line work applications in that the blue-line appeared on the sensitized plate, thereby producing an unsatisfactory end product.

Smaller printing shops have been unable to accept work or enter competitively into fields whereby composited negatives or positives become multiple images on a press plate in order to accomplish large volume printing orders. The essence of successful creation of multiple images on a press plate is the maintenance of completely accurate register during the multiple exposure process. The need for such an accurate register has required use of an expensive step and repeat machine. The large cost of a step and repeat machine for all practical purposes eliminated the small print shop operator from a substantial portion of the printing and multiple exposure photography field.

Prior attempts to provide a low cost step and repeat process and apparatus have utilized a blue-line grid element to position a positive or negative over sensitized plate during exposure. In certain applications the blue-lines have appeared on the exposed plate, thus producing an unsatisfactory job.

A need, therefore, arose in the printing and photography field for an inexpensive process and apparatus which would permit successful creation of multiple images of a composited negative or positive onto a sensitized pressed plate.

It is therefor an object of this invention to provide an inexpensive method and apparatus whereby a composited negative or positive may be exposed so as to create multiple images onto a press plate.

Another object of this invention is to provide a method for exposing multiple images of a composited negative or positive in repetitively accurate adjusted register orientation onto a press plate.

Another object of this invention is to provide an apparatus and method utilizing a transparent transfer sheet member to create repetitively accurate "stepped off" images of a composited negative or positive upon a sensitized press plate.

Still another object of this invention is to provide a method and apparatus for the step and repeat multiple exposure of a negative or positive upon a sensitized plate whereby the gridded blue-line reference sheet is not utilized during the exposure step.

GENERAL DESCRIPTION

Figure 1:
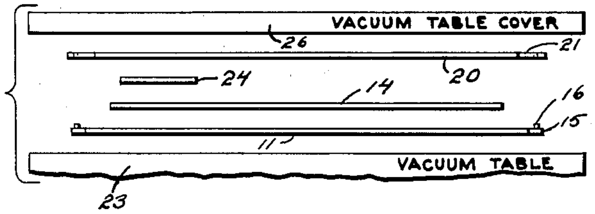
FIGURE 1 is an exploded schematic front view illustrating the transfer sheet member in its inverted use position within the vacuum table frame whereby the composited negative is in direct contact with the sensitized press plate upon the master plate sheet.

In general this invention relates to the photography and photolithography field. In order to produce artistic copy containing photographs for advertising purposes, it is first necessary to produce "layouts." These are produced by creating a line negative upon which inserts are placed. A silver print proof is made of the "layout" to show the customer for his approval. After customer approval, "layouts" are contacted in order to obtain a composited negative or positive of the complete job.

A check is then made of the quantity of run and quantity of sheets to press. With this information, determination is then made of the number of "stepped off" images of the composited negative which must be made upon the sensitized press plate.

It is imperative that each succeeding image must be in register and hence the negative or positive must be accurately positioned before an exposure is made. The importance of this requirement is emphasized in color work where repetitive accurate register is necessary to produce satisfactory and attractive work. In addition, repetitive accurate register is important in re-run work where certain color images are run to the exclusion of others.

An element of the instant invention is a master plate sheet which is provided with a base reference line and a center mark that are utilized to accurately position a sensitized press plate upon the master plate sheet. The master plate sheet which is provided with transfer sheet index pins is mountable upon the rubber back of a vacuum printing frame. The sensitized press plate is positionable accurately upon the master plate sheet so as to receive multiple images of a composited negative or positive.

A blue-line grid control reference sheet is provided also having transfer sheet reference index pins that have the identical relative positioning as the transfer sheet reference index pins of the master plate sheet.

A transfer sheet member is provided which selectively engages the master plate sheet and the blue-line reference sheet. The transfer sheet is transparent and provided with index pin engaging tabs that insure selective repetitive accurate register of the transfer sheet upon the master plate sheet and the blue-line grid control sheet, respectively.

The blue-line grid reference sheet is generally positioned on a light table so as to matingly receive the transparent transfer sheet. The negative or positive is mountable on the transfer sheet in any predetermined position with reference to the blue-line grid of the reference sheet visible through the transparent transfer sheet. The transfer sheet is then removed from the grid reference sheet, inverted endwise, and placed on the master plate sheet so as to place the negative or positive in direct contact with the sensitized press plate. The negative or positive is then exposed, creating an image upon the sensitized press plate. It is inherent in this method and apparatus to "mask" over the portion of the sensitized plate which is yet to be exposed and which has already been exposed.

After the first exposure, the transfer sheet is removed from the master plate sheet and returned to the reference blue-line sheet in its correct use position. The negative or positive is then moved to the next adjacent predetermined "stepped over" position by reference to the blue-line grid of the reference sheet. Thus repetitively accurate "stepped over" multiple images are created upon the sensitized press plate with a minimum of expense and effort.

SPECIFIC DESCRIPTION

Figure 2:
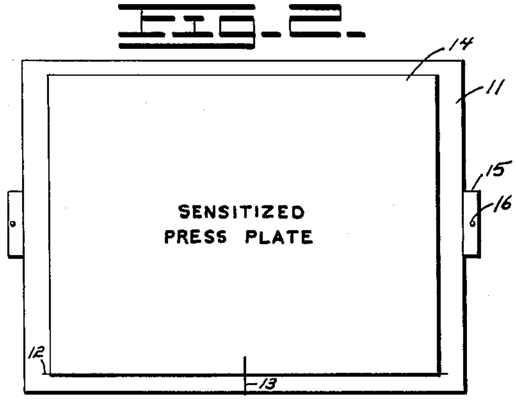
FIGURE 2 is a top view of the master plate sheet illustrating its positioning register marks and the sensitized press plate in position thereon.

As shown in FIGURE 2, the master plate sheet 11 is a substantially rectangular flexible sheet of transparent plastic. The master plate sheet 11 is provided with a longitudinal base register or reference line 12 and vertical center mark 13 for the proper positioning of a sensitized press plate 14 thereon. It is within the scope of this invention to utilize any suitable type of reference points for the sensitized press plate 14. The press plate 14 is made of metal having a photo-sensitive surface and is of a type commonly used in the printing field.

The master plate sheet 11 is provided with master plate sheet tabs 15 at each side. In the preferred embodiment the tabs 15 are provided with upright index pins 16.

Figure 4:
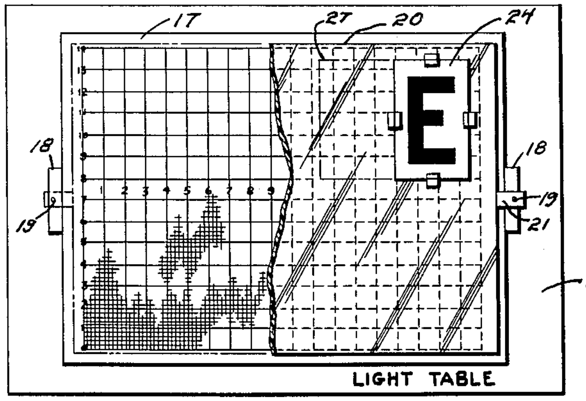
FIGURE 4 is a top view of the light table illustrating the blue-line grid control reference sheet thereon and showing the transparent transfer sheet in mating register over the blue-line reference sheet. A negative is further shown in referenced position upon the transparent transfer sheet.

The blue-line grid control reference sheet 17, shown in FIGURE 4, is also a substantially rectangular sheet of transparent plastic. Numbered grid lines are provided on the blue-line control sheet 17 in the ratio of sixteen lines to the inch. However, it is within the scope of this invention to utilize any number of grid lines provided that they are accurately spaced on the blue-line control sheet 17. Blue-line grid reference sheet tabs 18 are provided on the blue-line reference sheet 17 having upright index pins 19 thereon which have the same relative positioning as the reference pins 16 of the master plate sheet 11. This always insures the same repetitive accurate register of the transfer step sheet 20 over the blue-line reference sheet as over the master plate sheet 11. It is important to note that whatever index means are utilized to insure accurate repetitive register of the transfer sheet over the master plate sheet or the blue-line grid reference sheet, such indexing means must be positioned to permit selective inversion of the transfer sheet during the transfer.

Figure 3:
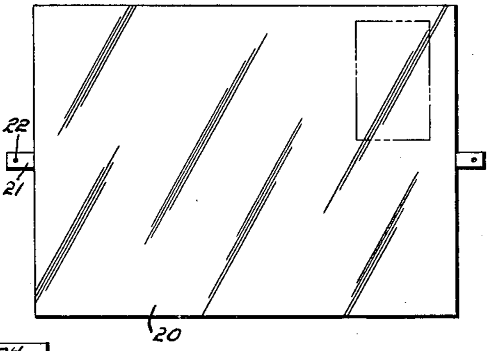
FIGURE 3 is a top view of the transparent transfer sheet member illustrating in phantom line a negative or positive in position thereon and further showing the tabs defining index-pin receiving holes therethrough.

The transfer step sheet member 20, shown in FIGURE 3, consists of a rectangular sheet of transparent plastic having a centrally located tab 21 extending from each end thereof. Each tab 21 is provided with an index pin receiving hole 22 therethrough. The holes 22 are positioned so as to be in selective register orientation with the index pins 16 of the master plate sheet 11 and the index pins 19 of the blue-line grid sheet 17.

It is within the scope of the invention to utilize any other known means, such as snaps for instance, to insure that the transfer step sheet 20 is always in accurate repetitive register with the master plate sheet 11 or the blue-line grid sheet 17 when in the use position.

OPERATION

Figure 6:
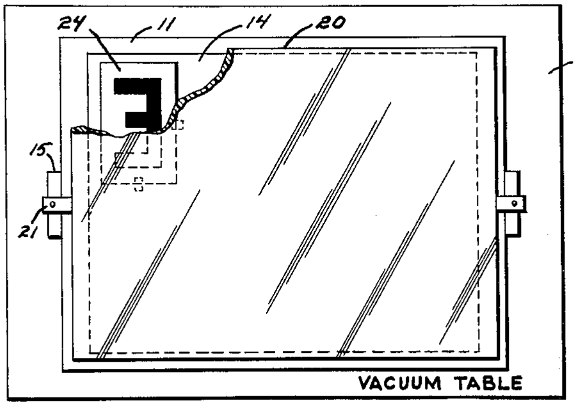
FIGURE 6 is a top break-away view of FIGURE 1 illustrating the transparent transfer member in its mating inverted use position upon the master plate sheet and further showing the negative in direct contact with the sensitized plate.

In use, the master plate sheet 11 is mounted upon the vacuum table 23, as shown in FIGURES 1 and 6. The sensitized press plate 14 is then placed in position on the master plate sheet 11 and is properly centered by use of the reference lines 12 and 13, as shown in FIGURE 2.

The photographer or printer, then predetermines the exact required positioning of the composited negative or positive 24 on the transfer sheet 20 during the exposure process which creates multiple images on the sensitized press plate 14.

Figure 5:
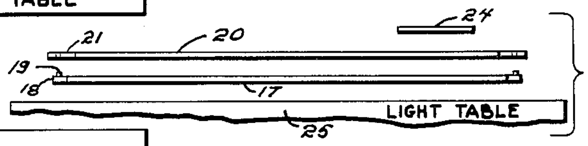
FIGURE 5 is an exploded schematic front view showing the relative positioning of the light table, blue-line grid control reference sheet, transparent transfer sheet and negative, as shown in FIGURE 4.

The blue-line grid reference sheet 17 is generally positioned upon a light table 25. After the required positioning of the negative or positive has been predetermined, the transparent transfer sheet 20 is placed upon the blue-line grid reference sheet 17, as shown in FIGURES 4 and 5. In this position, the index pin receiving holes 22 matingly receive the index pins 19 of the blue-line grid reference sheet 17.

The composited negative or positive 24 is then taped (emulsion side up) to the transfer sheet 20 after proper alignment by reference to the blue-line grid lines of the reference sheet 17 visible through the transparent transfer sheet 20.

Once the composited negative or positive 24 is in position on the transfer sheet 20, the transfer step sheet 20 is then removed from the blue-line grid reference sheet 17, inverted endwise, and then placed on the master plate sheet 11 so that the negative or positive 24 is in direct contact with the sensitized press plate 14, as shown in FIGURES 1 and 6. The transfer sheet 20 and the master plate sheet 11 are always in accurate repetitive register with each other because the index pins 16 of the master plate sheet 11 engage the openings 22 of the transfer sheet tabs 21. In this position, the emulsion side of the negative 24 is in direct contact with the sensitized press plate 14, thus insuring a clear sharp image. This eliminates the blurring or "fuzzineses" which may occur if exposure is made through a transparent sheet of material.

It is thus seen that a "sandwich" is formed consisting of the master plate sheet 11, the sensitized press plate 14, the composited negative or positive 24, and the transfer sheet 20. It is inherent in the process to "mask" with opaque paper the portion of the press plate which is not to be exposed, i.e., the portion not in contact with the negative or positive 24. Thus the portion of the sensitized plate 14 to be "masked" would be the portion of the plate to receive future images and the portion which had been previously exposed.

The vacuum table top 26 is then closed and the vacuum table 23 and the vacuum table top 26 form the outside of the "sandwich" described above. This relationship is shown in the exploded view of FIGURE 1.

An exposure is made of the composited negative or positive 24 directly on to the sensitized press plate 14 thus creating the first image of the compositive negative 24 on the face of the sensitized press plate 14.

The transfer sheet 20 is removed from the master plate sheet 11, re-inverted endwise, and is placed upon the blue-line grid reference sheet 17. The composited negative 24 is then moved to the next predetermined step position 27 (shown in phantom line in FIGURE 4) by reference to the blue-line grid visible from the underlying grid control reference sheet 17. The cycle is repeated and a subsequent adjacent exposure is made on the press plate 14. This process may be repeated as many times as is necessary and accurate adjusted register orientation of the negative or positive 24 in relation to previous exposures is always insured by virtue of the fact that the transfer sheet 20 is always in selective accurate repetitive register with the master plate sheet 11 and the grid reference sheet 17.

It is thus seen that a simple apparatus is provided which provides a service hitherto available only through an expensive step and repeat machine. The high cost of such a machine has practically eliminated the small printer from a highly lucrative field.

In addition, an inexpensive step and repeat method and apparatus has been provided which does not incorporate a blue-line grid control element into the exposure portion of the process, thus eliminating the possibility of having the blue-lines appear on the exposed plate.

It is thus seen that in essence a first surface is provided which is substantially identical in size with a second gridded reference surface. Identically located indexing means are provided on each of these surfaces which permit the selective interchange of an intermediate transfer surface between the first surface and the second surface.

These cooperating elements provide an inexpensive step and repeat apparatus not found in the known prior art.

Various modifications of the invention may be made without departing from the principle thereof. Each of these modifications is to be considered as included in the hereinafter appended claim unless this claim by its language expressly provides otherwise.

Having thus set forth the nature of my invention, I claim the following:

An apparatus adapted for the step and repeat reproduction of the same film transparency comprising: a flat flexible rectangular master plate sheet provided at each end with an index pin tab having upwardly extending master plate indexing pins mounted thereon; and a second flat transparent flexible transfer sheet member of substantially the same size as said master plate sheet and having at each end indexing pin receiving tabs in register with and adapted to receive said master plate indexing pins, said second transfer sheet member positioned on said master plate sheet in said register, said second transfer sheet member and said master plate sheet being adapted to receive therebetween a sensitized press plate of substantially the same size coated with a photographic emulsion and a movable transparency overlying said sensitized plate so as to create an image upon said sensitized press plate upon exposure through said transparent transfer sheet member, said master plate sheet having press plate positioning lines thereon; and a third transparent blue-line grid reference sheet located adjacent to said master plate sheet and provided at each end with a reference sheet index pin tab having upwardly extending reference sheet indexing pins mounted thereon, said reference sheet being of substantially the same size as said master plate sheet and said transfer sheet member, said reference sheet indexing pins in register with and adapted to engage said indexing pin receiving tabs provided on said transfer sheet member, said transparent transfer sheet overlying said blue line grid reference sheet and adapted to receive a movable transparency thereon, said movable transparency selectively positionable on said transparent transfer sheet by reference to said underlying blue line grid reference sheet and for subsequent transfer to said master plate sheet so as to overlay said sensitized press plate.

References Cited in the file of this patent

UNITED STATES PATENTS

| | | |
|---|---|---|
| 1,220,245 | Little | Mar. 27, 1917 |
| 1,310,385 | Betts | July 15, 1919 |
| 1,777,144 | Innes | Sept. 30, 1930 |
| 2,711,031 | Kessler | June 21, 1955 |
| 2,752,245 | Hough et al. | June 26, 1956 |